(No Model.)
L. H. JENKS.
VALVE.
No. 495,415. Patented Apr. 11, 1893.
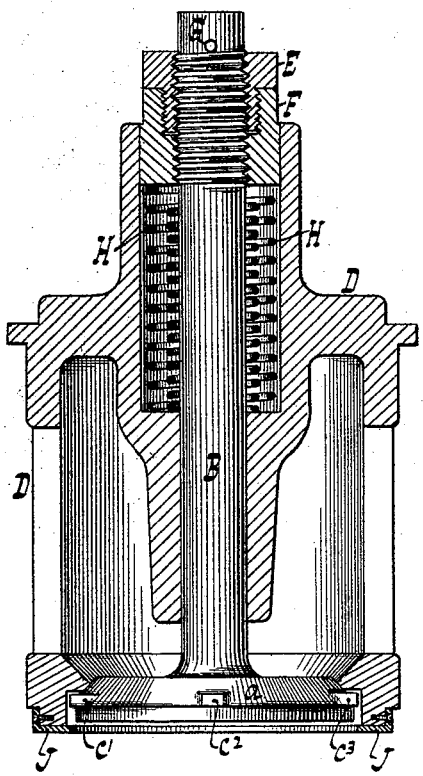
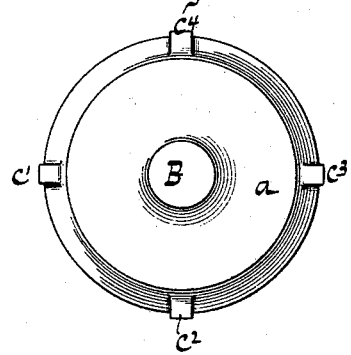
WITNESSES:
William L. Miller
Edward Wolff
INVENTOR:
Llywellyn Howard Jenks
BY
Van Santvoord & Hauff
ATTORNEYS.

UNITED STATES PATENT OFFICE.

LLYWELLYN HOWARD JENKS, OF NEW YORK, N. Y., ASSIGNOR OF ONE-HALF TO JOSEPH KOENIGSBERG, OF SAME PLACE.

VALVE.

SPECIFICATION forming part of Letters Patent No. 495,415, dated April 11, 1893.

Application filed November 17, 1892. Serial No. 452,286. (No model.)

*To all whom it may concern:*

Be it known that I, LLYWELLYN HOWARD JENKS, a citizen of the United States, residing at New York, in the county and State of New York, have invented new and useful Improvements in Valves, of which the following is a specification.

The object of this invention is to provide a novel, simple and effective device for preventing a valve, such for instance as an inverted suction valve, which closes inwardly into its seat, from dropping out when the same becomes accidentally detached from its stem, said device being applicable to the suction or induction valves in the compressors of refrigerating or ice making machines, where the valve if it become accidentally detached is drawn into the compressor and is liable to produce serious injury to the machinery.

In the accompanying drawings Figure 1, represents a vertical central section of a cage containing a valve constructed according to my invention. Fig. 2 is a plan or top view of the valve.

Heretofore certain safety devices have been in use with the view to reach the results which are obtained by my invention, but all such devices have been confined to lock nuts or other fasteners on the stem of the valve and in order to prevent these nuts from unscrewing the stem B (Fig. 1) is sometimes pierced above the nut E for the reception of a split pin or key G or the nut E is held by a set screw or by the combined action of a key and set screw. Such devices are entirely ineffective if the stem of the valve be fractured anywhere below between the nuts or locking devices, such locking devices being unable to prevent the disk of the valve from falling or being drawn into the compressor or pump to the injury or destruction of the same.

In the accompanying drawings the letter $a$ designates the valve disk.

B is the valve stem.
D is the frame or cage.
E is the nut and F the lock nut.
H is a spring which acts to close the valve.
G is a key which prevents the nut E from unscrewing.

For the purpose of preventing the valve disk from dropping down, when the stem becomes loose or fractured I provide the valve disk with lugs $c^I$, $c^{II}$, $c^{III}$, $c^{IV}$ which extend in a direction approximately at right angles with the axis of the valve disk and when the valve drops, they engage a lip J removably secured to the bottom of the cage D. In the example shown in the drawings this lip is formed by a ring secured in position by means of screws and if it is desired to remove the valve said ring is taken off and secured again in its place, after the valve has been replaced in its position.

Instead of using a ring which extends clear round one or more sections of a ring could be used to form the lip or lips.

What I claim as new, and desire to secure by Letters Patent, is—

The combination with a cage having a valve seat, of a valve adapted to close inwardly against said valve-seat and provided with a stop which projects laterally therefrom past the circumference of the valve, and a detachable lip secured to the cage beneath the valve seat and beneath the laterally projecting stop on the valve, substantially as described.

In testimony whereof I have hereunto set my hand in the presence of two subscribing witnesses.

LLYWELLYN HOWARD JENKS.

Witnesses:
J. VAN SANTVOORD,
E. F. KASTENHUBER.